US008243785B2

(12) United States Patent
Weitbruch et al.

(10) Patent No.: US 8,243,785 B2
(45) Date of Patent: Aug. 14, 2012

(54) METHOD AND APPARATUS FOR MOTION DEPENDENT CODING

(75) Inventors: Sébastien Weitbruch, Kappel (DE); Carlos Correa, Villingen-Schwenningen (DE); Cédric Thebault, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1525 days.

(21) Appl. No.: 11/732,686

(22) Filed: Apr. 4, 2007

(65) Prior Publication Data

US 2007/0237229 A1 Oct. 11, 2007

(30) Foreign Application Priority Data

Apr. 11, 2006 (EP) .................................... 06290589

(51) Int. Cl.
*H04N 11/02* (2006.01)

(52) U.S. Cl. ............................. 375/240.01; 375/240.16

(58) Field of Classification Search ............. 375/240.01, 375/16, 24, 26

See application file for complete search history.

(56) References Cited

U.S. PATENT DOCUMENTS

2004/0263539 A1* 12/2004 Chiaki et al. .................. 345/690
2005/0253972 A1* 11/2005 Wwitbruch et al. .......... 348/797
2007/0043527 A1* 2/2007 Quan et al. .................... 702/104

FOREIGN PATENT DOCUMENTS

EP 1256924 A1 11/2002
EP 1376521 A1 1/2004
EP 1522963 A1 4/2005
EP 1613098 A1 1/2006

OTHER PUBLICATIONS

Search Report Dated Sep. 18, 2006.

* cited by examiner

*Primary Examiner* — Edward Zee
*Assistant Examiner* — Chi Nguy
(74) *Attorney, Agent, or Firm* — Tutunjian & Bitetto, P.C.

(57) ABSTRACT

The gravity centered coding shall be improved with respect to false contour effect disturbances on plasma display panels for example. Therefore, there is provided a GCC code (gravity center coding) and a motion amplitude of a picture or a part of a picture. Furthermore, there is provided at least one sub-set code of the GCC code. The video data are coded with the GCC code or the at least one sub-set code depending on the motion amplitude. Thus, it is possible to reduce the number of coding levels if the motion increases. A further improvement can be obtained by using texture information for selecting the GCC code.

8 Claims, 11 Drawing Sheets

METHOD AND APPARATUS FOR MOTION DEPENDENT CODING

This application claims the benefit, under 35 U.S.C. §119 of European Patent Application 06290589.8, filed on Apr. 11, 2006.

FIELD OF THE INVENTION

The present invention relates to a method for processing video data for display on a display device having a plurality of luminous elements corresponding to the pixels of a picture including the provision of a GCC code (gravity center coding) for coding video input data. Furthermore, the present invention relates to a respective apparatus for processing video data.

BACKGROUND OF THE INVENTION

First of all, the false contour effect shall be explained with a Plasma Display Panel (PDP). Generally, a PDP utilizes a matrix array of discharge cells, which could only be "ON" or "OFF". Therefore, unlike a CRT or LCD in which gray levels are expressed by analogue control of the light emission, a PDP controls the gray level by a pulse Pulse Width Modulation (PWM) of each cell. This time-modulation will be integrated by the eye over a period corresponding to the eye time response. The more often a cell is switched on in a given time frame, the higher is its luminance (brightness). For example, when disposing of 8 bit luminance levels (256 levels per colour, so 16.7 million colours), each level can be represented by a combination of the 8 following bits:

1-2-4-8-16-32-64-128.

To realize such a coding, the frame period can be divided in 8 lighting sub-periods (called sub-fields), each corresponding to a bit and a brightness level. The number of light pulses for the bit "2" is the double as for the bit "1" etc. With these 8 sub-periods, it is possible through combination to build the 256 gray levels. The eye of an observer will integrate these subperiods over a frame period to catch the impression of the right gray level. FIG. 1 presents this decomposition.

The light emission pattern introduces new categories of image-quality degradation corresponding to disturbances of gray levels and colours. These will be defined as "dynamic false contour effect" since they correspond to disturbances of gray levels and colours in the form of an apparition of coloured edges in the picture when an observation point on the plasma panel moves. Such failures on a picture lead to the impression of strong contours appearing on homogeneous areas. The degradation is enhanced when the image has a smooth gradation (like skin) and when the light-emission period exceeds several milliseconds.

When an observation point (eye focus area) on the PDP screen moves, the eye will follow this movement. Consequently, it will no more integrate the same cell over a frame (static integration) but it will integrate information coming from different cells located on the movement trajectory and it will mix all these light pulses together, which leads to a faulty signal information.

Basically, the false contour effect occurs when there is a transition from one level to another with a totally different code. So the first point is from a code (with n sub-fields) which permits to achieve p gray levels (typically p=256), to select m gray levels (with m<p) among the $2^n$ possible sub-fields arrangements (when working at the encoding) or among the p gray levels (when working at the video level) so that close levels will have close sub-fields arrangements.

The second point is to keep a maximum of levels, in order to keep a good video quality. For this the minimum of chosen levels should be equal to twice the number of sub-fields.

For all further examples, a 11 sub-fields mode defined as following is used:

1 2 3 5 8 12 18 27 41 58 80.

For these issues the Gravity Centre Coding (GCC) was introduced in document EP 1 256 924.

As seen previously, the human eye integrates the light emitted by Pulse Width Modulation. So if one considers all video levels encoded with a basic code, the time position of these video levels (the centre of gravity of the light) is not growing continuously with the video level as shown in FIG. 2.

The centre of gravity CG2 for a video level 2 is larger than the centre of gravity CG1 of video level 1. However, the centre of gravity CG3 of video level 3 is smaller than that of video level 2.

This introduces false contour. The centre of gravity is defined as the centre of gravity of the sub-fields 'on' weighted by their sustain weight:

$$CG(\text{code}) = \frac{\sum_{i=1}^{n} sfW_i * \delta_i(\text{code}) * sfCG_i}{\sum_{i=1}^{n} sfW_i * \delta_i(\text{code})}$$

where $sfw_i$ is the sub-field weight of $i^{th}$ sub-field. $\delta_i$ is equal to 1 if the $i^{th}$ sub-field is 'on' for the chosen code, 0 otherwise. $SfCG_i$ is the centre of gravity of the $i^{th}$ sub-field, i.e. its time position, as shown in FIG. 3 for the first seven sub-fields.

The temporal centres of gravity of the 256 video levels for the 11 sub-fields code chosen here can be represented as shown in FIG. 4.

The curve is not monotonous and presents a lot of jumps. These jumps correspond to false contour. According to GCC these jumps are suppressed by selecting only some levels, for which the gravity centre will grow continuously with the video levels apart from exceptions in the low video level range up to a first predefined limit and/or in the high video level range from a second predefined limit on. This can be done by tracing a monotone curve without jumps on the previous graphic, and selecting the nearest point as shown in FIG. 5. Thus, not all possible video levels are used when employing GCC.

In the low video level region it should be avoided to select only levels with growing gravity centre because the number of possible levels is low and so if only growing gravity centre levels were selected, there would not be enough levels to have a good video quality in the black levels since the human eye is very sensitive in the black levels. In addition the false contour in dark areas is negligible.

In the high level region, there is a decrease of the gravity centres, so there will be a decrease also in the chosen levels, but this is not important since the human eye is not sensitive in the high level. In these areas, the eye is not capable to 2distinguish different levels and the false contour level is negligible regarding the video level (the eye is only sensitive to relative amplitude if the Weber-Fechner law is considered). For these reasons, the monotony of the curve will be necessary just for the video levels between 10% and 80% of the maximal video level.

In this case, for this example, 40 levels (m=40) will be selected among the 256 possible. These 40 levels permit to keep a good video quality (gray-scale portrayal).

This selection can be made when working at the video level, since only few levels (typically 256) are available. But when this selection is made at the encoding, there are 2' (n is the number of sub-fields) different sub-fields arrangements, and so more levels can be selected as seen on FIG. 6, where each point corresponds to a sub-fields arrangement (there are different sub-fields arrangements giving a same video level).

Furthermore, this method can be applied to different coding, like 100 Hz for example without changes, giving also good results.

On one hand, the GCC concept enables a visible reduction of the false contour effect. On the other hand, it introduces noise in the picture in the form of dithering needed since less levels are available than required. The missing levels are then rendered by means of spatial and temporal mixing of available GCC levels.

The number of levels selected for the GCC concept is a compromise between a high number of levels that is good for static areas (less dithering noise) but bad for moving areas (more false contour) and a low number of levels that is good for moving areas (less false contour effect) but bad for static areas (more dithering noise). In-between it is possible to define a larger amount of GCC coding that are located between one extreme and the other.

Document EP 1 376 521 introduces a technique based on a motion detection enabling to switch ON or OFF the GCC depending if there is a lot of motion in the picture or not.

SUMMARY OF THE INVENTION

In view of that, it is the object of the present invention to provide a method and a device which enable the usage of GGC with reduced false contour effect disturbances.

According to the present invention this object is solved by a method for processing video data for display on a display device having a plurality of luminous elements corresponding to the pixels of a picture including the steps of providing a GCC code for coding video input data, evaluating or providing a motion amplitude of a picture or a part of the picture, providing at least one sub-set code of said GCC code, coding the video data with said GCC code or said at least one sub-set code depending on said motion amplitude.

Furthermore, the present invention provides an apparatus for processing video data for display on a display device having a plurality of luminous elements corresponding to the pixels of a picture including coding means for coding video input data by means of a GCC code, the coded video data being usable for controlling said display device, wherein said coding means being capable of evaluating or receiving a motion amplitude of a picture or a part of the picture, said coding means being capable of providing at least one sub-set code of said GCC code, said coding means being capable of coding the video data with said GCC code or said at least one subset code depending on said motion amplitude.

The advantage of the inventive concept is that various GCC codes are provided so that the coding can be changed for example almost linearly depending on the motion amplitude (not direction).

In a simple embodiment the motion amplitude is evaluated on the basis of the difference of two pictures or two corresponding parts of pictures. Alternatively, there may be provided a complex motion detector for providing motion amplitude about the picture or the part of the picture to said coding means.

Preferably, several sub-set codes with mutually different numbers of coding levels are provided and the more motion the motion amplitude indicates, the lower the number of coding levels of that sub-set code being used for coding is. This means that the intensity of motion determines the code in a graduated manner.

The GCC code and the at least one sub-set code may be stored in tables in a memory. Otherwise, if a large memory shall not be used, the sub-set code may be generated for each pixel.

According to a further preferred embodiment, a skin tone within the picture or a part of the picture is measured and depending additionally (beside the motion) on the measured skin tone value the code for coding the video data is varied. Advantageously, the number of levels of the code is reduced if skin tone is detected. The variation of the code can be realized by multiplying a value of the motion amplitude by a factor depending on the measured skin tone value and/or by adding an offset value, the value of the motion amplitude being used for generating or selecting the code. If the processor capacity is not high enough, the code depending on the skin tone value may be retrieved from look up tables (LUT).

BRIEF DESCRIPTION OF THE DRAWINGS

Exemplary embodiments of the invention are illustrated in the drawings and in more detail in the following description. The drawings showing in.

DETAILED DESCRIPTION OF PREFERRED EMBODIMENTS

A preferred embodiment of the present invention relates to linear-motion coding for GCC.

The main idea behind this concept is to have a set of codes all based on the same skeleton. This is real important since if the picture is divided in regions depending on the movement in each region, the border between two regions must stay invisible. If there are totally different code words used in each region the border would become visible under the form of false contour borders.

Therefore, a first GCC code is defined using a lot of levels and providing a good and almost noise free grayscale for static areas. Then based on this code, levels are suppressed to go step by step to a coding that is more optimized for fast motion. Then, depending on the motion information obtained for each pixel, the appropriate sub-set of codes is used.

The motion information can be a simple frame difference (the stronger the difference between two frames is, the lower the number of levels being selected) or a more advanced information coming from real motion detection or motion estimation.

In the following, it is assumed that at the beginning of the PDP video chain, motion information is given as motion amplitude. This can be provided by either a motion detector/estimator located in the same chip or can be provided from a front-end chip having such block inside.

Figure 1:
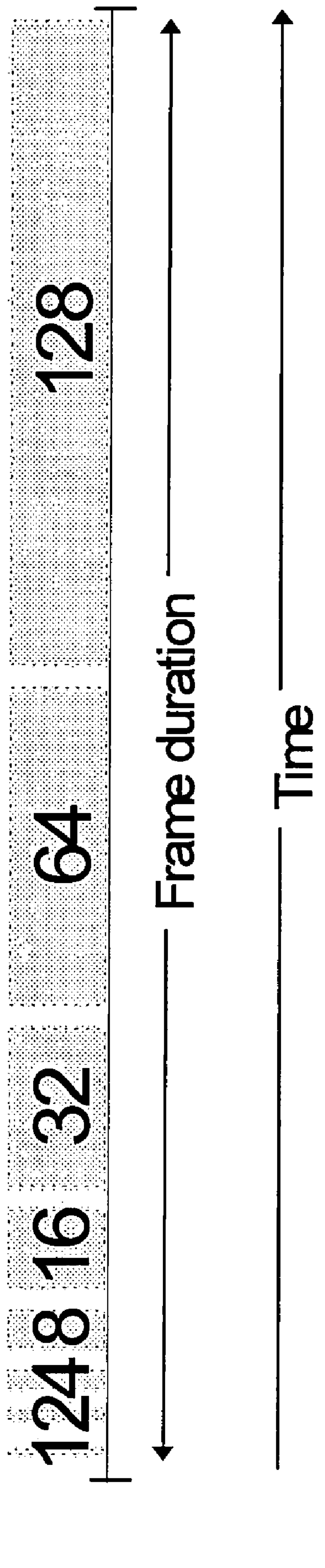
FIG. 1 the composition of a frame period for the binary code.
Figure 2:
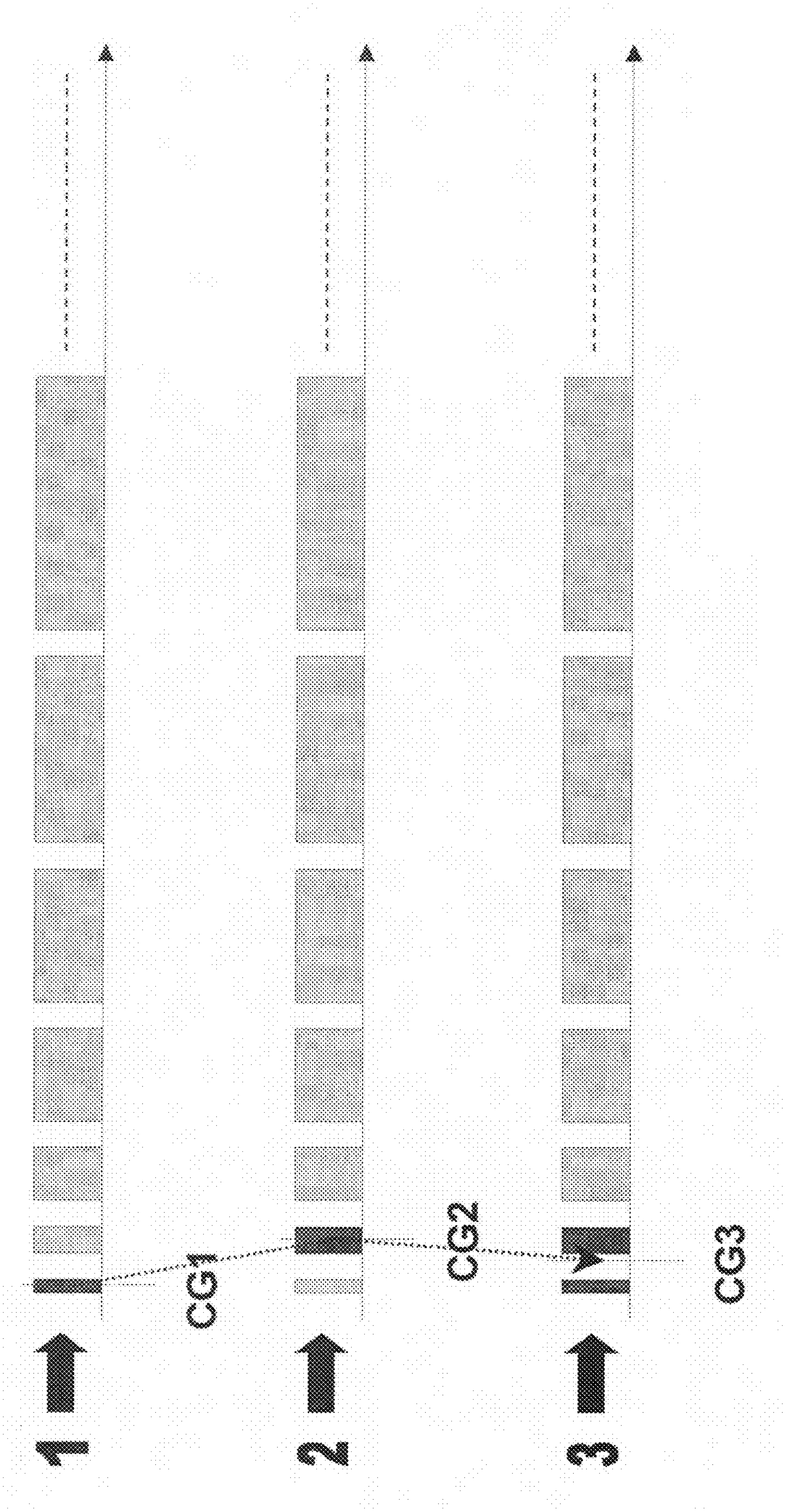
FIG. 2 the centre of gravity of three video levels.
Figure 3:
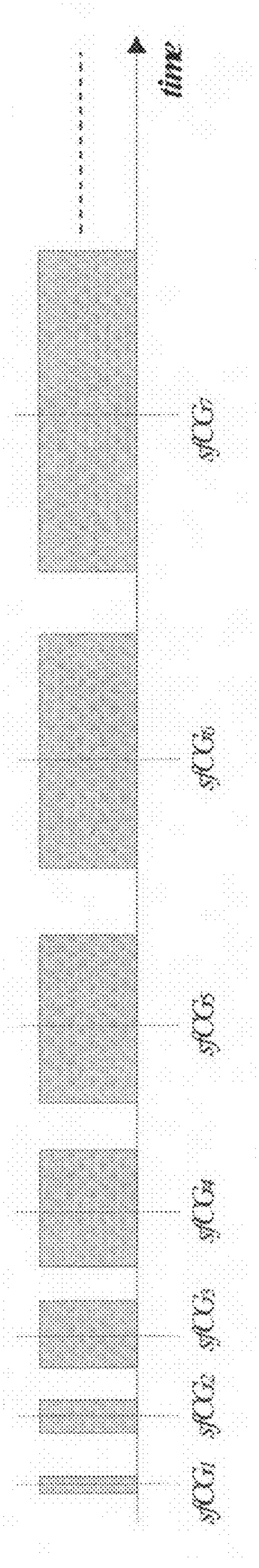
FIG. 3 the centre of gravity of sub-fields.
Figure 4:
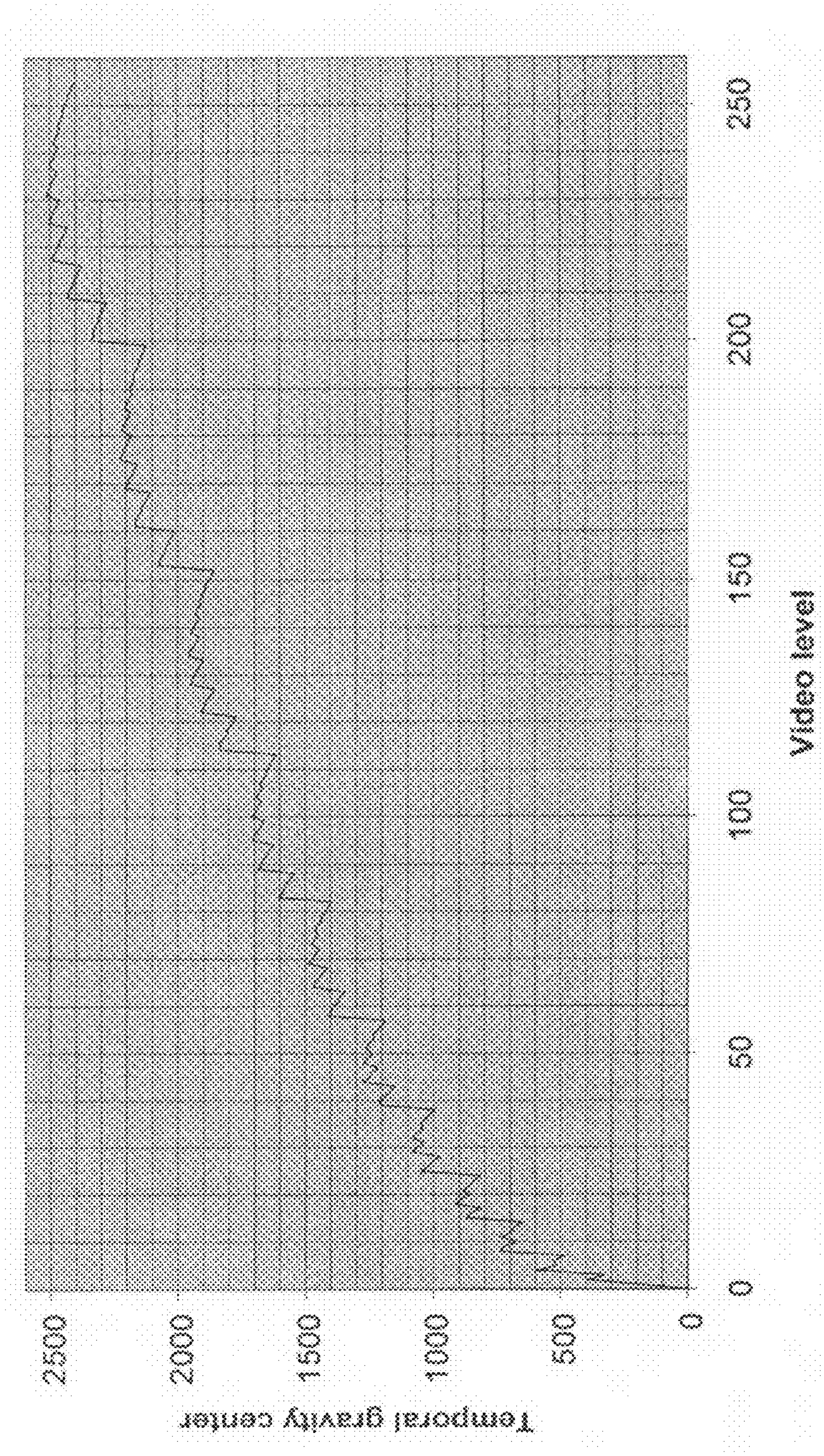
FIG. 4 the temporal gravity centre depending on the video level.
Figure 5:
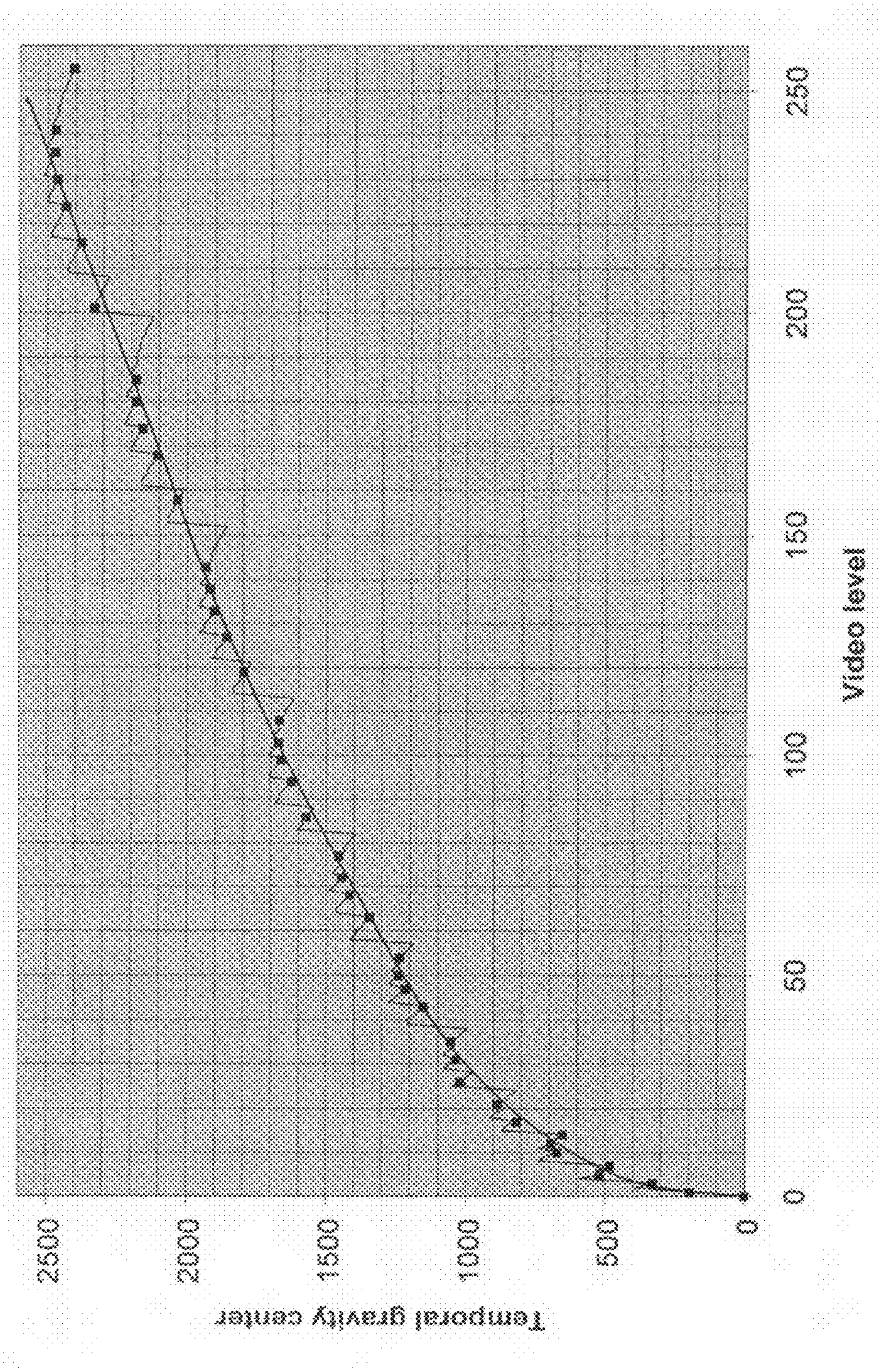
FIG. 5 chosen video levels for GCC.
Figure 6:
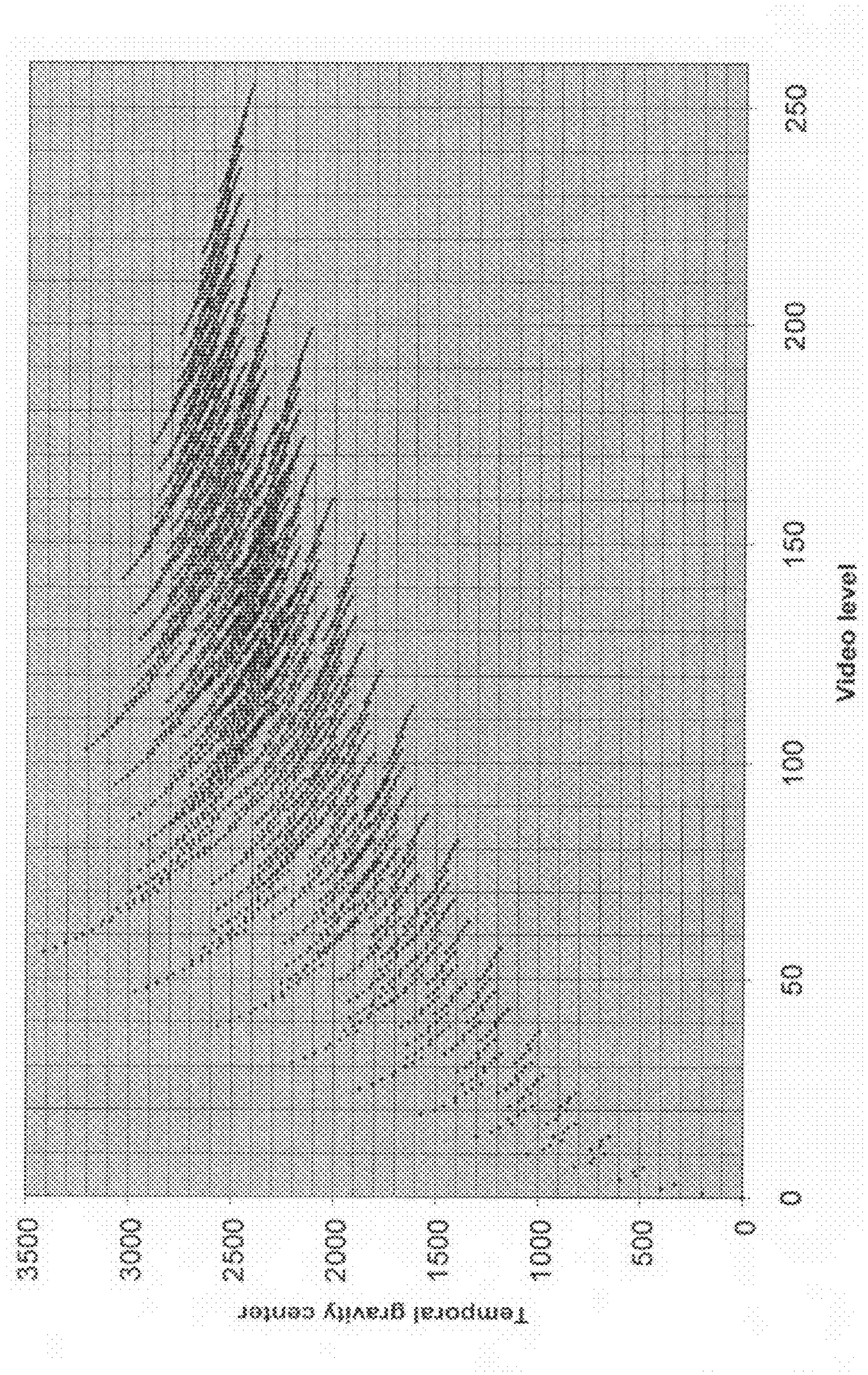
FIG. 6 the centre of gravity for different sub-field arrangements for the video levels.
Figure 7:
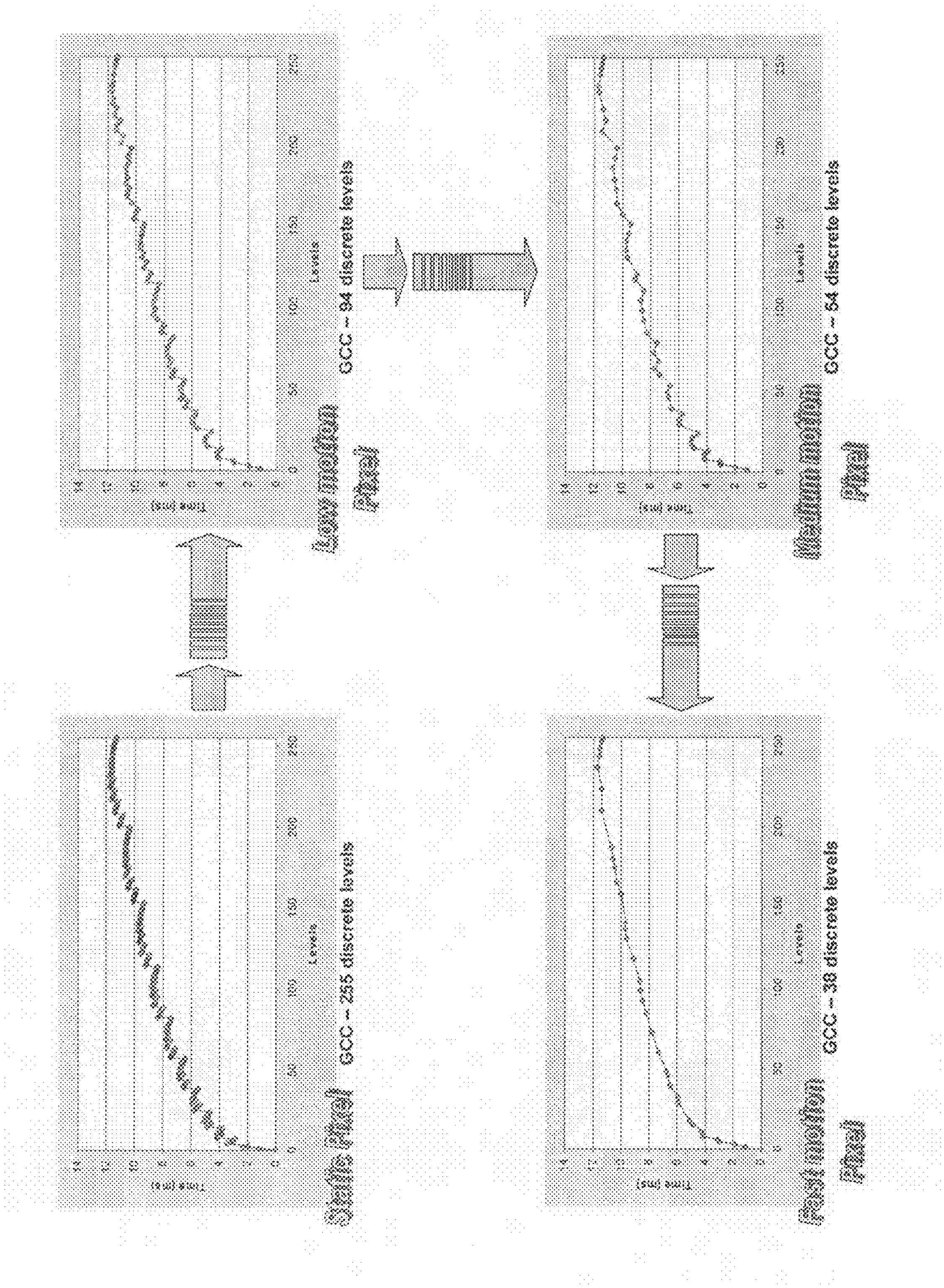
FIG. 7 time charts for several GCC codes with a different number of levels depending on the intensity of motion.

FIG. 7 shows that depending on the motion speed various GCC modes are selected from a high number of discrete levels for a static pixel up to a low number of discrete levels for a fast moving pixel.

In the present example a GCC code having 255 discrete levels is used for a static picture as shown in the upper left picture of FIG. 7, a GCC code having 94 discrete levels is used for coding a low motion pixel as shown in the upper right picture, a GCC code having 54 discrete levels is used for coding a medium motion pixel as is shown in the lower right picture and a GCC code having 38 discrete levels is used for coding a fast motion pixel as shown in the lower left picture of FIG. 7. As the number of discrete level decreases, the dithering noise level increases. This is only an example and much more sub-codes can be implemented.

However, one of the main ideas behind this concept is to get the best compromise between dithering noise level and moving quality. Furthermore, a very important aspect is that all GCC modes are made in a hierarchical way otherwise the concept will not work very well. This means that a mode k is automatically a subset of a mode k−1.

The number of modes is flexible and depends on the targeted application. These modes can be either all stored in the chip in various tables or generated for each pixel. In the first case the choice between tables will be done depending on the motion amplitude information. In the second case, the motion amplitude information will be used to compute directly the correct GCC encoding value.

The global concept is illustrated on the following table for the same example as shown in FIG. 7.

| Static area Mode 0 | ... | Almost static area Mode i | ... | Very low motion area Mode j | ... | Low motion area Mode k | ... | Medium motion area Mode l | ... | Fast motion area Mode m |
|---|---|---|---|---|---|---|---|---|---|---|
| 1 | ... | 1 | ... | 1 | ... | 1 | ... | 1 | ... | 1 |
| 2 | ... | 2 | ... | 2 | ... | | | | | |
| 3 | ... | 3 | ... | 3 | ... | 3 | ... | 3 | ... | 3 |
| 4 | ... | 4 | ... | 4 | ... | | | | | |
| 5 | ... | 5 | ... | 5 | ... | 5 | ... | 5 | ... | 5 |
| 6 | ... | 6 | ... | 6 | ... | 6 | ... | 6 | ... | 6 |
| 7 | ... | 7 | ... | 7 | ... | | | | | |
| 8 | ... | 8 | ... | 8 | ... | 8 | ... | 8 | ... | 8 |
| 9 | ... | | | | | | | | | |
| 10 | ... | 10 | ... | 10 | ... | | | | | |
| 11 | ... | 11 | ... | 11 | ... | 11 | ... | 11 | ... | 11 |
| 12 | ... | 12 | ... | | | | | | | |
| 13 | ... | 13 | ... | 13 | ... | 13 | ... | 13 | ... | |
| 14 | ... | 14 | ... | | | | | | | |
| 15 | ... | 15 | ... | 15 | ... | 15 | ... | 15 | ... | 15 |
| 16 | ... | 16 | ... | 16 | ... | | | | | |
| 17 | ... | | | | | | | | | |
| 18 | ... | 18 | ... | 18 | ... | 18 | ... | 18 | ... | 18 |
| 19 | ... | 19 | ... | 19 | ... | | | | | |
| 20 | ... | | | | | | | | | |

-continued

| | | | | | | | | | | |
|---|---|---|---|---|---|---|---|---|---|---|
| 21 | | 21 | | 21 | | 21 | | 21 | | |
| 22 | | 22 | | 22 | | | | | | |
| 23 | | | | | | | | | | |
| 24 | | 24 | | 24 | | 24 | | 24 | | |
| 25 | | 25 | | | | | | | | |
| 26 | | 26 | | 26 | | 26 | | | | |
| 27 | | | | | | | | | | |
| 28 | | 28 | | 28 | | | | | | |
| 29 | | 29 | | 29 | | 29 | | 29 | | 29 |
| 30 | | | | | | | | | | |
| 31 | | 31 | | 31 | | | | | | |
| 32 | | 32 | | 32 | | 32 | | 32 | | 32 |
| 33 | | 33 | | | | | | | | |
| 34 | | 34 | | 34 | | 34 | | | | |
| 35 | | | | | | | | | | |
| 36 | | 36 | | 36 | | 36 | | 36 | | |
| 37 | | | | | | | | | | |
| 38 | | 38 | | 38 | | | | | | |
| 39 | | 39 | | 39 | | 39 | | 39 | | 39 |
| 40 | | 40 | | 40 | | | | | | |
| 41 | | | | | | | | | | |
| 42 | | 42 | | 42 | | 42 | | | | |
| 43 | | 43 | | | | | | | | |
| 44 | | 44 | | 44 | | 44 | | | | |
| 45 | | 45 | | 45 | | | | | | |

| | | | | | | | | | | |
|---|---|---|---|---|---|---|---|---|---|---|
| 46 | | 46 | | 46 | | 46 | | 46 | | 46 |
| 47 | | | | | | | | | | |
| 48 | | 48 | | | | | | | | |
| 49 | | 49 | | 49 | | 49 | | 49 | | 49 |
| 50 | | | | | | | | | | |
| 51 | | 51 | | 51 | | 51 | | | | |
| 52 | | | | | | | | | | |
| 53 | | 53 | | 53 | | 53 | | 53 | | |
| 54 | | 54 | | 54 | | | | | | |
| 55 | | | | | | | | | | |
| 56 | | 56 | | 56 | | 56 | | | | |

.
.
.

| | | | | | | | | | | |
|---|---|---|---|---|---|---|---|---|---|---|
| 213 | | 213 | | 213 | | 213 | | | | |
| 214 | | 214 | | 214 | | | | | | |
| 215 | | 215 | | 215 | | | | | | |
| 216 | | 216 | | 216 | | 216 | | 216 | | |
| 217 | | 217 | | 217 | | | | | | |
| 218 | | 218 | | | | | | | | |
| 219 | | 219 | | 219 | | 219 | | | | |
| 220 | | 220 | | 220 | | | | | | |
| 221 | | | | | | | | | | |
| 222 | | 222 | | 222 | | | | | | |
| 223 | | 223 | | 223 | | 223 | | 223 | | 223 |

| | | | | | | | | | | |
|---|---|---|---|---|---|---|---|---|---|---|
| 224 | | 224 | | 224 | | | | | | |
| 225 | | 225 | | | | | | | | |
| 226 | | 226 | | 226 | | 226 | | | | |
| 227 | | 227 | | 227 | | | | | | |
| 228 | | 228 | | 228 | | | | | | |
| 229 | | 229 | | 229 | | 229 | | | | |
| 230 | | 230 | | | | | | | | |
| 231 | | | | | | | | | | |
| 232 | | 232 | | 232 | | | | | | |
| 233 | | 233 | | 233 | | 233 | | 233 | | |
| 234 | | 234 | | 234 | | | | | | |
| 235 | | | | | | | | | | |
| 236 | | 236 | | 236 | | | | | | |
| 237 | | 237 | | 237 | | 237 | | 237 | | 237 |
| 238 | | 238 | | 238 | | | | | | |
| 239 | | 239 | | 239 | | | | | | |
| 240 | | 240 | | 240 | | 240 | | | | |

-continued

| | | | | | | | | | | | |
|---|---|---|---|---|---|---|---|---|---|---|---|
| | 241 | | 241 | | | | | | | | |
| | 242 | | | | | | | | | | |
| | 243 | | 243 | | 243 | | | | | | |
| | 244 | | 244 | | 244 | | 244 | | 244 | | 244 |
| | 245 | | 245 | | 245 | | | | | | |
| | 246 | | | | | | | | | | |
| | 247 | | 247 | | 247 | | | | | | |
| | 248 | | 248 | | 248 | | 248 | | 248 | | 248 |
| | 249 | | 249 | | 249 | | | | | | |
| | 250 | | 250 | | | | | | | | |
| | 251 | | 251 | | 251 | | 251 | | 251 | | 251 |
| | 252 | | 252 | | 252 | | | | | | |
| | 253 | | 253 | | 253 | | 253 | | 253 | | 253 |
| | 254 | | 254 | | 254 | | 254 | | 254 | | 254 |
| | 255 | | 255 | | 255 | | 255 | | 255 | | 255 |
| Nb | 256 | | 207 | | 177 | | 94 | | 54 | | 38 |

The table shows per column the selected levels for each mode. An empty cell means that the level has not been selected. For intermediate modes (for example between mode 0 and mode I), the symbol " . . . " means that the code can be either selected or not depending on the optimization process.

As it can be seen on the previous table, a mode l contains always less discrete levels than a mode k when k<l. Furthermore, all discrete levels from mode l are always available in mode k.

The next paragraph will propose a possibility to define the various modes. Specifically, a hierarchical mode construction will be shown.

Figure 8:
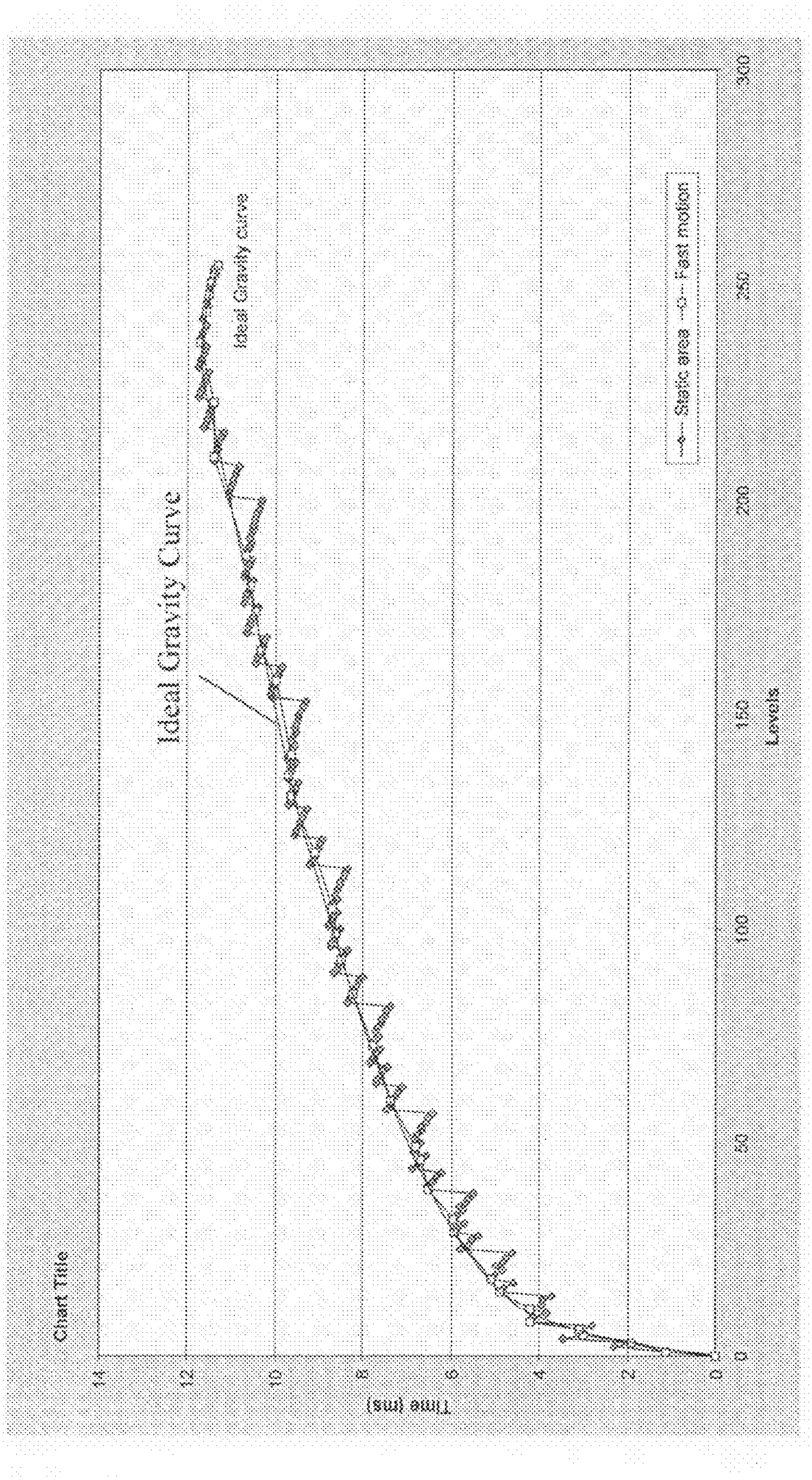
FIG. 8 a time chart showing hierarchical GCC codes.

In order to define all required modes in a linear way so that they can be changed linearly to motion, a new concept has been developed based on the distance to the ideal GCC curve. For the illustration of this concept FIG. 8 presents three curves:

- the curve of gray rhombs built with all discrete levels (e.g. 255 in our example) defined for static areas
- the curve of white squares built with all discrete levels (e.g. 38 in our example) for fast moving areas
- the black ideal curve to select gravity centres in order to minimize moving artifacts.

Figure 9:
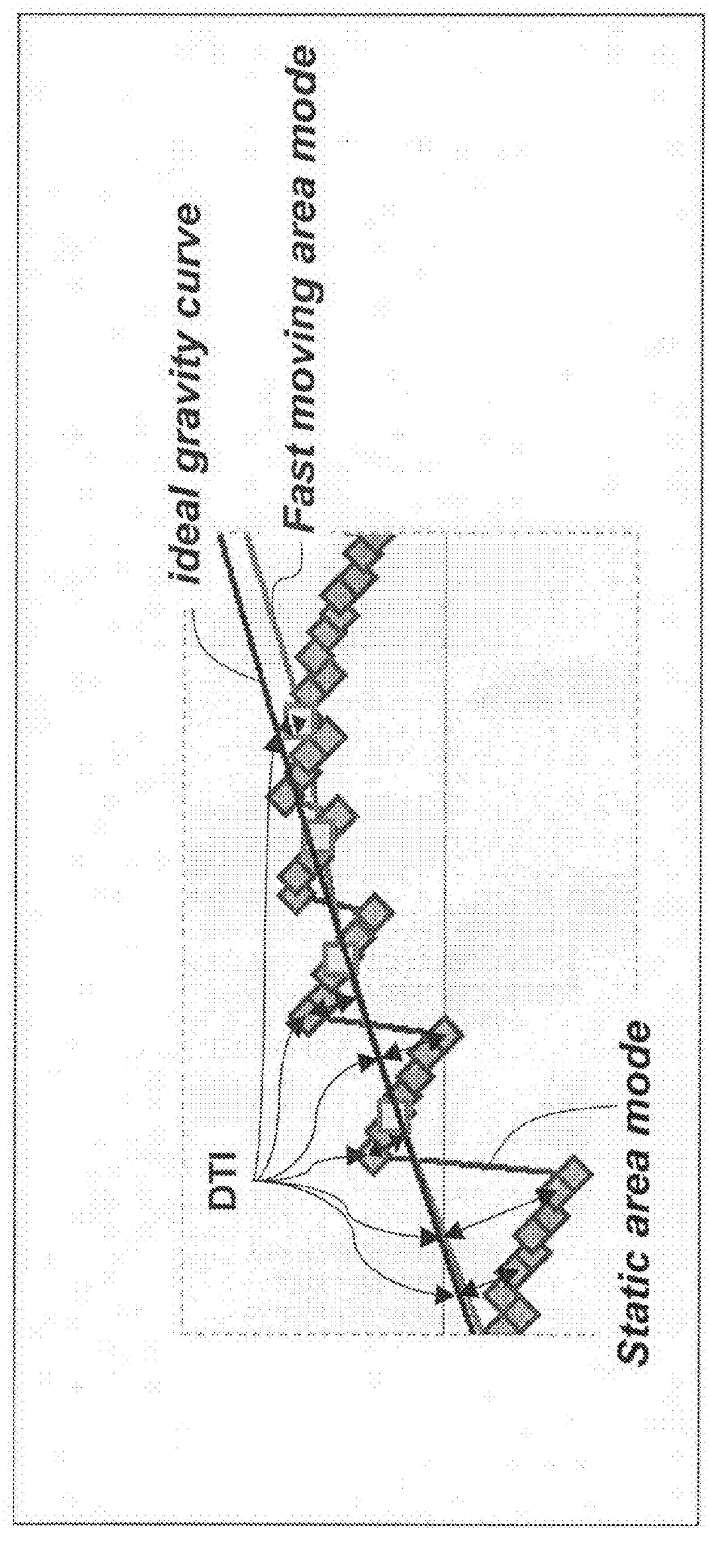
FIG. 9 a cut out of FIG. 8.

In order to define a motion dependent coding, a parameter called DTI (Distance To Ideal) is defined for each available discrete level of the static area code. This DTI describes the distance between the gravity centre of a code word to the ideal GCC curve (black curve). FIG. 9 shows DTIs for same levels of the curves of FIG. 8. The DTI has to be evaluated for each level (code word).

Then, the respective DTI will be associated to each code word. In order to obtain various coding depending on the movement each DTI will be compared to a certain motion amplitude. The higher the motion amplitude is, the lower the DTI must be to have a selected code word. With this concept it is possible to define a large amount of coding modes varying with the motion amplitude.

Figure 10:
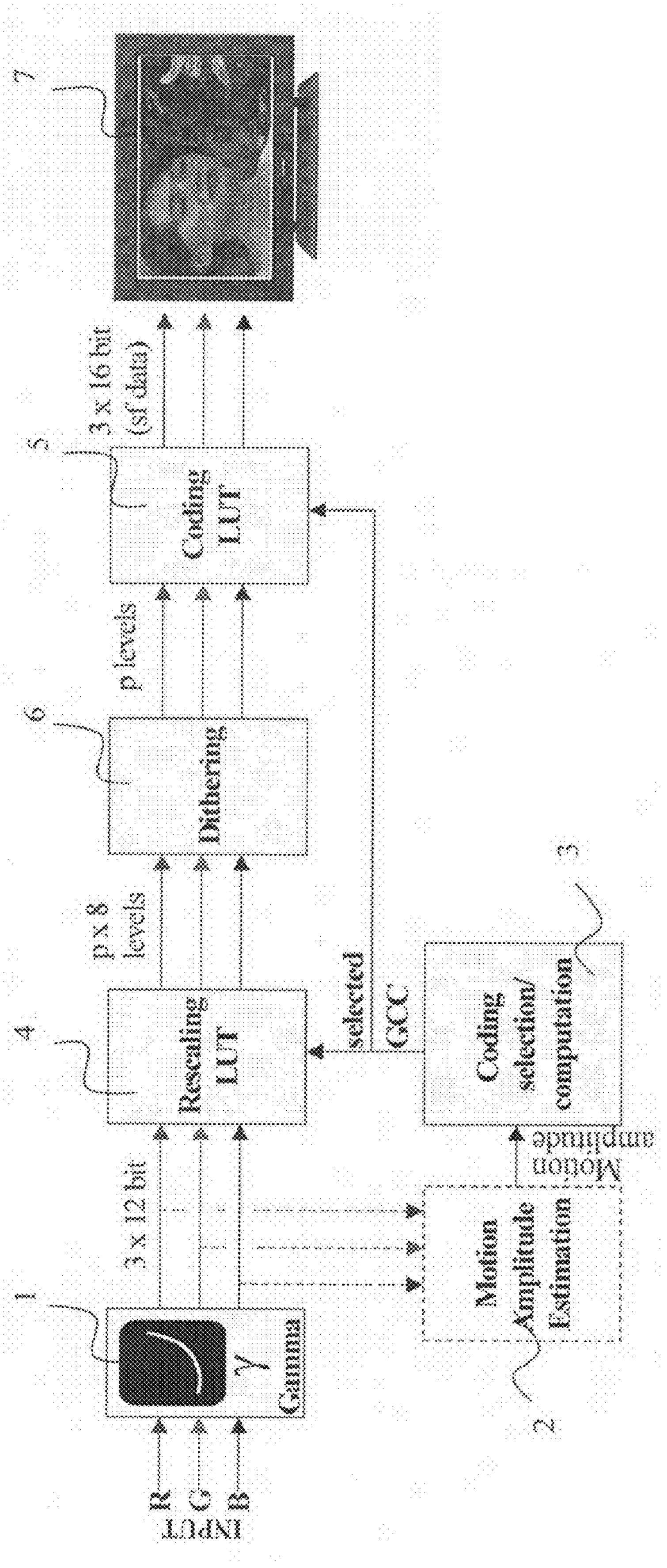
FIG. 10 a block diagram for implementing the inventive concept.

Now, a concept of hardware implementation will be illustrated along with FIG. 10. As already said, the various codes with hierarchical structure can be either computed on the fly or the various codes are stored in different tables on-chip.

In the first case, only the DTI is computed by software and stored for each code word in a LUT on-chip. Then, for each incoming pixel, a motion amplitude information is generated or provided. This information will be compared to the DTI information of each code to determine if the code must be used or not.

In the second case, a number P of tables are stored in the chip. The DTI information could be used to define such tables but it is not absolutely mandatory. Additionally, some experimental fine-tuning of the tables can be adopted to further improve the behavior. In that case, the motion amplitude will determine which table must be used to code the current pixel.

According to FIG. 10, the input R, G, B picture is forwarded to the gamma block 1 performing a quadratic function under the form $$\text{Out} = 4095 \times \left(\frac{\text{Input}}{\text{MAX}}\right)^{\gamma}$$

where γ is more or less around 2.2 and MAX represents the highest possible input value. The output should be at least 12 bits to be able to render correctly low levels. The output of this gamma block 1 could be forwarded to a motion amplitude estimation block 2 that is optional (e.g. calculating simple frame difference). However, in theory, it is also possible to perform the motion amplitude estimation before the gamma block 1.

In any case, motion amplitude information is mandatory for each incoming pixel. If there is no motion amplitude estimation inside the PDP IC, external motion information must be available (e.g. output of a motion estimation used in the front-end part for up-conversion purposes).

The motion amplitude information is send to a coding selection block 3, which will select the appropriate GCC coding to be used or which will generate the appropriate coding to be used for the current pixel. Based on this selected or generated mode, the resealing LUT 4 and coding LUT 5 are updated. The rescaling unit 4 performs the GCC, whereas the coding unit 5 performs the usual sub-field coding. Between them, the dithering block 6 will add more than 4 bits dithering to correctly render the video signal. It should be noticed that the output of the resealing block 4 is p×8 bits where p represents the total amount of GCC code words used (from 255 to 38 in our example). The 8 additional bits are used for dithering purposes in order to have only p levels after dithering for the encoding block 5. The encoding block 5 delivers 3×16 bit sub-field data to the plasma display panel 7. All bits and dithering relevant numbers are only given as example (more than 16 sub-fields can be available, more than 4 bits dithering is also possible).

A further improvement of the motion coding can be achieved by regarding texture information. Such texture information relates to a skin tone texture, for example. The skin tone texture is very sensitive to motion rendition. Therefore a more hierarchical decision concept could be used to improve the final picture quality as described with FIG. 11.

Figure 11:
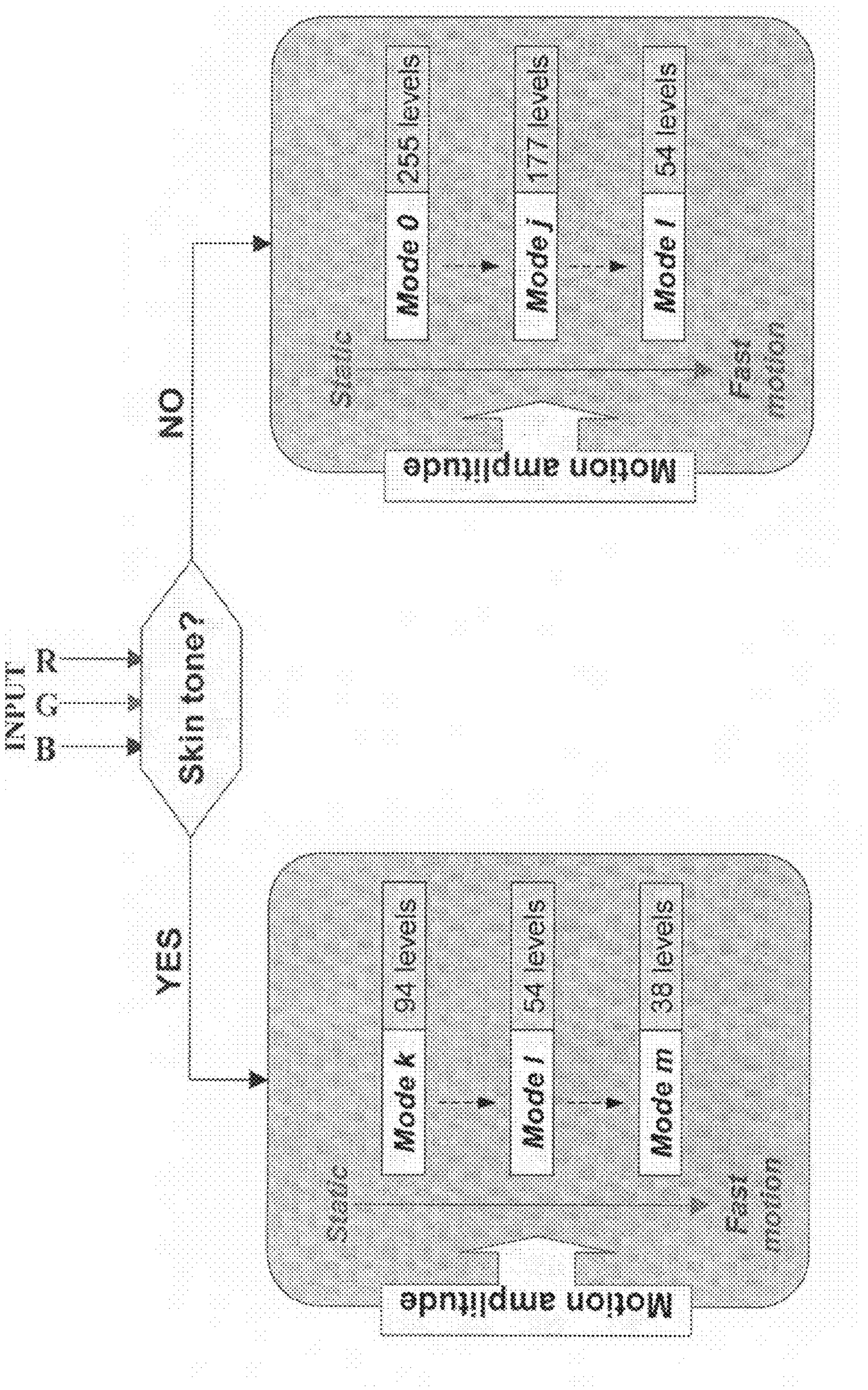
FIG. 11 a logical block diagram for selecting an appropriate code depending on motion and skin tone.

Accordingly, skin tone areas and normal areas are handled differently (cf. European Patent Application 04 291 674.2). In the case of skin tone, even static areas could be handled with a more optimized motion coding compared to normal areas. As illustrated in FIG. 11, the input data before or after the gamma correction are analysed for a skin tone texture. If a skin tone is detected, generally, codes with a lower number of levels are used (94 levels even for static pictures and 38 levels for fast motion pixels. Otherwise, if no skin tone is detected, codes with a higher number of levels are used (255 levels for static pixels and 54 for fast motion pixels).

In any case, the information of motion should have more impact on skin tone areas than on normal areas.

A possible implementation is either to use two different sets of multiple codes but this will increase the memory on-chip too much if LUTs are used or to use a transformation for the motion amplitude in case of skin tone.

Such a transformation formula is given as following:

$$|V'| = \begin{cases} a \times |V| + b & \text{if skin detected} \\ |V| & \text{else} \end{cases}$$

where |V| represent the original motion amplitude. Values a and b are correction coefficients used for skin areas. When both textures should have the same coding in static areas, b is chosen to be equal to 0.

The invention claimed is:

1. Method for processing video data for display on a display device having a plurality of luminous elements corresponding to the pixels of a picture, the method comprising the steps of providing a GCC code for coding video input data, evaluating or providing a motion amplitude of a picture or a part of the picture, determining a texture value within the picture or part of the picture said texture value being a skin tone value;

providing at least one sub-set code of said GCC code, varying the GCC code or one of the subset codes depending on the determined texture value by multiplying a value of said motion amplitude by a factor depending on the skin tone value, said value of said motion amplitude being used for generating or selecting the GCC code or one of the sub-set codes coding the video data with said GCC code for small motion amplitude or said at least one sub-set code depending on said motion amplitude, and selecting a sub-set code with a lower number of coding levels for a greater motion amplitude.

2. Method according to claim 1, wherein said motion amplitude is evaluated on the basis of the difference of two pictures or two corresponding parts of pictures.

3. Method according to claim 1, wherein several sub-set codes with mutually different numbers of coding levels are provided and the number of coding levels of that sub-set code being used for coding is lower as the motion amplitude indicates more motion.

4. Method according to claim 1, wherein said GCC code and said at least one sub-set code are stored in tables in a memory.

5. Method according to claim 1, wherein said at least one sub-set code is generated for each pixel.

6. Method according to claim 1, wherein a distance between the gravity center of a code word and a pre-given GCC curve is determined for each GCC code word and wherein the GCC code or one of the sub-set codes for coding said video data is selected on the basis of said distance.

7. Apparatus for processing video data for display on a display device having a plurality of luminous elements corresponding to the pixels of a picture including coding means for coding video input data by means of a GCC code, the coded video data being usable for controlling said display device, wherein said coding means are provided for evaluating or receiving a motion amplitude of a picture or a part of the picture, said coding means providing at least one sub-set code of said GCC code, and said coding means coding the video data with said GCC code for small motion amplitude or said at least one subset code depending on said motion amplitude, and wherein a sub-set code with a lower number of coding levels is chosen for a greater motion amplitude;

texture measurement means for measuring a texture value, preferably a skin tone value within a picture or a part of a picture, so that said coding means are provided for varying the GCC code or one of the sub-set codes used for coding the video data depending additionally on the determined texture value.

8. Apparatus according to claim 7 including motion detection means for providing motion amplitude about said picture or said part of picture to said coding means.

* * * * *